Jan. 1, 1935.  B. F. CONNER  1,986,323
COMPOSITE ARTICLE OF MANUFACTURE
Filed Aug. 24, 1933
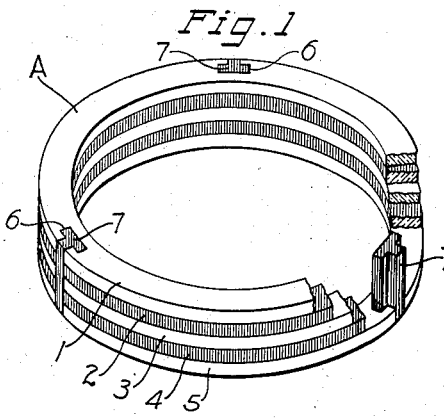
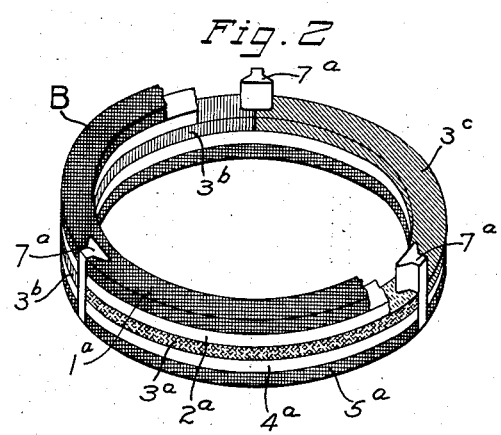
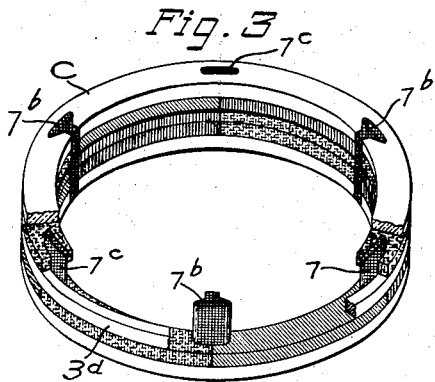
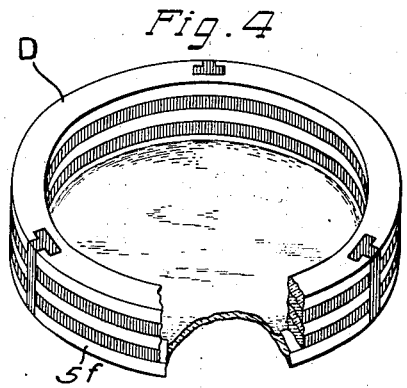
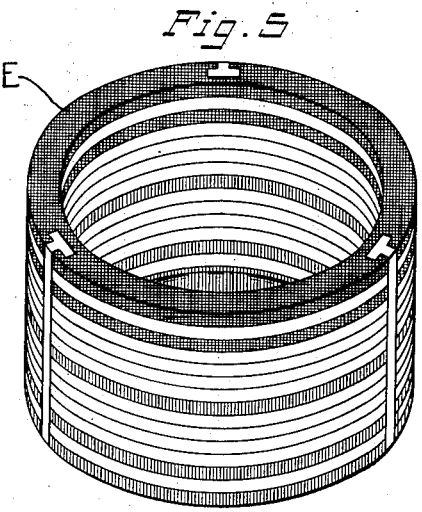
Inventor
Benjamin F. Conner
By S. Jay Teller
Attorney Patented Jan. 1, 1935

1,986,323

UNITED STATES PATENT OFFICE 1,986,323

COMPOSITE ARTICLE OF MANUFACTURE

Benjamin F. Conner, Wethersfield, Conn., assignor to Colt's Patent Fire Arms Manufacturing Co., Hartford, Conn., a corporation of Connecticut Application August 24, 1933, Serial No. 686,595

8 Claims. (Cl. 217—5)

The invention relates particularly to an article of manufacture of ornamental character, as for instance a bracelet or a small approximately cylindrical receptacle. The principal object of the invention is to provide an article of manufacture of the general character described adapted to permit readily and at a minimum cost a wide variety of color combinations and effects.

In the accompanying drawing I have shown several embodiments of the invention, but it will be understood that the drawing is intended for illustrative purposes only and is not to be construed as defining or limiting the scope of the invention, the claims forming a part of this specification being relied upon for that purpose.

Of the drawing:

Fig. 1 is a perspective view of a bracelet embodying the invention, a portion thereof being broken away in order that the mechanical construction may be more readily apparent.

Fig. 2 is a view similar to Fig. 1, but showing an alternative construction.

Fig. 3 is a view also similar to Fig. 1, but showing another alternative construction.

Fig. 4 is a perspective view showing a shallow receptacle such as a "coaster" embodying the invention.

Fig. 5 is a view similar to Fig. 4, but showing a deeper receptacle which may be used for containing cosmetic preparations, as for instance powder.

In Fig. 1 of the drawing I have shown a bracelet A comprising a plurality of similar annular rings formed with parallel flat faces and positioned in direct engagement with each other. As shown there are five rings marked 1, 2, 3, 4 and 5, but it will be understood that the number of rings may be widely varied without departing from the spirit of the invention. I have illustrated rings with simple cylindrical inner and outer surfaces, but I do not so limit myself.

Each of the rings is formed with a plurality of similar transverse slots 6, 6, and the rings are arranged so that the respective slots in the several rings are in register with each other. The slots 6, 6 may vary in shape, but in Fig. 1 I have shown them as each having a narrow portion open at one edge, preferably the peripheral edge, and also having an inner or interior wider portion. The slots are shown as being T-shaped, but as to this there may be variation. Positioned within and fitting the several slots 6, 6 are transverse tie members 7, 7. These tie members closely fit the slots and with the aid of suitable cement serve to hold the several rings in their predetermined relationship.

The several rings and tie members may advantageously be molded from synthetic resin materials, but I do not necessarily so limit myself as some of the said parts may, if desired, be formed of metal. Preferably the several molded rings are differently colored, and if metal rings are used they may have any suitable finish, as for instance chromium or copper. As illustrated the rings 1, 3 and 5 are white and the rings 2 and 4 are red.

With the slots 6, 6 open at the periphery, as shown in Fig. 1, the tie members 7, 7 are exposed at the periphery and thus serve in combination with the annular rings themselves to provide a highly attractive design. The tie members may be of any desired color or finish, but I have shown them as being of the same color as the rings 2 and 4, that is, red. Thus the tie members are colored differently from the end rings 1 and 5 and there is provided a pleasing color contrast at the ends.

It will be understood that by varying the color combinations of the rings themselves, and by still further varying the colors of the tie members, a very large number of highly attractive designs and color combinations can be obtained at a minimum expense. It is only necessary for the manufacturer to provide molds or dies for two different articles, that is, the rings and the tie members. By molding or forming these articles in different colors or from different materials the before-mentioned wide variety of designs can be obtained.

In Fig. 2 I have shown a bracelet B in many respects similar to the bracelet A shown in Fig. 1. It differs, however, in that the tie members $7^a$, $7^a$ are somewhat differently shaped.

The bracelet B differs further from the bracelet A in that at least one of the rings, as for instance the central ring, is formed in three separate sectors $3^a$, $3^b$ and $3^c$. It will be observed that the division planes between the respective sectors are positioned midway of the tie members $7^a$, $7^a$, the result being that each sector is held at both ends by the corresponding tie members. In this way the sectors are held in place and prevented from moving radially inward or outward. While I have shown only the central ring as being formed in sectors, it will be obvious that any one or more of the rings, other than the outer rings $1^a$ and $5^a$, could be formed in sectors.

By dividing one or more of the rings into sectors as shown and described a still wider variety of designs and color combinations is readily obtainable. As shown in Fig. 2 the rings 1ª and 5ª are black, the rings 2ª and 4ª are white and the segments 3ª, 3ᵇ and 3ᶜ are orange, red and green respectively. The tie members 7ª, 7ª are white. It will be obvious that the described mechanical construction permits a very large variety of designs and combinations.

In Fig. 3 I have shown a bracelet C differing from the bracelets A and B in that the slots and the corresponding tie members are spaced inward from the outer periphery. I have shown six tie members which are of two different types. The three tie members 7ᵇ, 7ᵇ are similar to the tie members 7ª, 7ª shown in Fig. 2, but reversed so as to be exposed at the inner surface instead of at the outer surface. The tie members 7ᶜ, 7ᶜ are not exposed at either the outer surface or at the inner surface of the bracelet, but merely at the end surfaces. It will be understood that all of the tie members may be of one form, that is, either like 7ᵇ, 7ᵇ or 7ᶜ, 7ᶜ.

With tie members as shown, which are spaced from the periphery of the bracelet, it is possible to use a continuous metal ring such as 3ᵈ which is of less width than the other rings and which engages at its inner surfaces with the outer surfaces of the tie members. One or more rings such as 3ᵈ may be interposed between the other rings to provide a different ornamental effect. Obviously the simple narrow metallic ring 3ᵈ is less expensive than would be a wider ring with slots therein.

The two rings adjacent the central metal ring 3ᵈ are shown as consisting of separate sectors, each ring having six sectors in alternating colors. However there may be wide variations as to the forming of the rings in one piece or in sectors, and as to the selection and arrangement of colors.

Fig. 4 shows a shallow receptacle D such as a coaster. The construction shown is similar to that shown in Fig. 1 with the exception that the bottom member 5ᶠ, instead of being a ring, is a plate which constitutes a bottom for the receptacle. While in Fig. 4 I have shown a construction similar to that in Fig. 1, it will be understood that I do not so limit myself and that the construction may be varied in the manner illustrated in Figs. 2 and 3 or otherwise.

In Fig. 5 I have shown a deeper receptacle E which differs from the receptacle D merely in that there are a larger number of rings. It will be understood that the mechanical construction may be varied as already described in connection with Figs. 2 and 3. The receptacle E may be used for containing cosmetic preparations, such as powder, and may be provided with a suitable cover. It will be apparent that the depth may be varied by changing the number of rings, and that the design and color combinations may be varied widely in the manner already indicated in connection with Figs. 2 and 3.

What I claim is:

1. An article of manufacture comprising in combination, a plurality of similar annular rings each formed with parallel flat faces and with a plurality of transverse slots each having a narrow portion open at one edge and an interior wider portion, the said rings being arranged with the faces of adjacent rings in engagement with each other and with the respective slots in register with each other, and a plurality of transverse tie members positioned within and fitting the registering slots.

2. An article of manufacture comprising in combination, a plurality of similar annular rings each formed with parallel flat faces and with a plurality of transverse slots each having a narrow portion open at the periphery and an inner wider portion, the said rings being arranged with the faces of adjacent rings in engagement with each other and with the respective slots in register with each other, and a plurality of transverse tie members positioned within and fitting the registering slots.

3. An article of manufacture comprising in combination, a plurality of similar differently colored annular rings each formed with parallel flat faces and with a plurality of transverse slots each having a narrow portion open at the periphery and an inner wider portion, the said rings being arranged with the faces of adjacent rings in engagement with each other and with the respective slots in register with each other, and a plurality of transverse tie members positioned within and fitting the registering slots, the said members being colored differently from at least one of the end rings to provide contrasting colors at the said end.

4. An article of manufacture comprising in combination, a plurality of similar annular rings and a bottom plate each formed with parallel flat faces and with a plurality of transverse slots each having a narrow portion open at the periphery and an inner wider portion, the said rings and bottom plate being arranged with the faces of adjacent rings and plate in engagement with each other and with the respective slots in register with each other, and a plurality of transverse tie members positioned within and fitting the registering slots.

5. An article of manufacture comprising in combination, a plurality of similar annular rings each formed with parallel flat faces and with a plurality of transverse slots, the said rings being arranged with the faces of adjacent rings in engagement with each other and with the respective slots in register with each other and at least one of the said rings consisting of sectors having their planes of separation positioned midway of the said slots, and a plurality of transverse members positioned within and fitting the registering slots, the said members serving not only to tie all of the rings together but also serving to prevent radial movement of the said sectors.

6. An article of manufacture comprising in combination, a plurality of similar differently colored annular rings each formed with parallel flat faces and with a plurality of transverse slots, the said rings being arranged with the faces of adjacent rings in engagement with each other and with the respective slots in register with each other and at least one of the said rings consisting of sectors of different colors having their planes of separation positioned midway of the said slots, and a plurality of transverse members positioned within and fitting the registering slots, the said members serving not only to tie all of the rings together but also serving to prevent radial movement of the said sectors and the said members being colored differently from at least one of the end rings to provide contrasting colors at the said end.

7. An article of manufacture comprising in combination, a plurality of similar annular rings each formed with parallel flat faces and with a plurality of transverse slots each having a narrow portion open at the periphery and an inner wider portion, the said rings being arranged with the faces of adjacent rings in engagement with each other and with the respective slots in register with each other and at least one of the said rings consisting of sectors having their planes of separation positioned midway of the said slots, and a plurality of transverse members positioned within and fitting the registering slots, the said members serving not only to tie all of the rings together but also serving to prevent radial movement of the said sectors.

8. An article of manufacture comprising in combination, a plurality of similar annular rings each formed with parallel flat faces and with a plurality of transverse slots spaced inward from the periphery, the said rings being arranged with the respective slots in register with each other, a plurality of transverse tie members positioned within and fitting the registering slots, and an additional ring of less width than the first said rings and interposed between two of them, the said additional ring engaging at its inner surface with the outer surfaces of the tie members.

BENJAMIN F. CONNER.